United States Patent
Ha et al.

(10) Patent No.: US 7,539,779 B2
(45) Date of Patent: May 26, 2009

(54) METHOD FOR SEPARATING MULTIPLE HOME NETWORKS

(75) Inventors: Sam Chul Ha, Changwon-shi (KR); Seung Myun Baek, Changwon-shi (KR); Koon Seok Lee, Changwon-shi (KR); Jeong Hyun Lim, Kimhae-shi (KR); Hwan Jong Choi, Changwon-shi (KR); Ja In Koo, Jinju-shi (KR); Dae Woong Kim, Changwon-shi (KR); Sung Hwan Kang, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 608 days.

(21) Appl. No.: 10/481,831

(22) PCT Filed: Apr. 10, 2002

(86) PCT No.: PCT/KR02/00652

§ 371 (c)(1),
(2), (4) Date: Aug. 11, 2004

(87) PCT Pub. No.: WO03/001747

PCT Pub. Date: Jan. 3, 2003

(65) Prior Publication Data

US 2004/0267964 A1 Dec. 30, 2004

(30) Foreign Application Priority Data

Jun. 26, 2001 (KR) ................ 2001-36617

(51) Int. Cl.
*G06F 15/16* (2006.01)
(52) U.S. Cl. ............ 709/249; 709/220; 709/221; 709/222; 709/236; 710/9; 710/10; 379/102.03; 379/201.01; 370/389; 370/392
(58) Field of Classification Search ......... 709/220–222, 709/236, 249; 710/9–10; 370/389, 392
See application file for complete search history.

(56) References Cited

U.S. PATENT DOCUMENTS 3,925,763 A 12/1975 Wadhwani et al.

(Continued)

FOREIGN PATENT DOCUMENTS

JP 8018698 1/1996

(Continued)

OTHER PUBLICATIONS

International Search Report, Korean Intellectual Property Office; Jul. 25, 2002.

(Continued)

*Primary Examiner*—Yves Dalencourt
*Assistant Examiner*—Michael C Lai
(74) *Attorney, Agent, or Firm*—McKenna Long & Aldridge LLP

(57) ABSTRACT

A method for separating multiple home networks networked in one communication line into each home network is disclosed, which includes the steps of forming home network for networking apparatuses in the house to communicate with one another, setting individual home codes to each apparatus, connecting the home networks formed in a plurality of houses to one another, and forming packet data including the home codes for communicating.

6 Claims, 2 Drawing Sheets

U.S. PATENT DOCUMENTS

| | | |
|---|---|---|
| 5,579,221 A | 11/1996 | Mun |
| 6,243,707 B1 * | 6/2001 | Humpleman et al. ........ 707/102 |
| 6,523,696 B1 * | 2/2003 | Saito et al. ................... 709/223 |
| 6,735,619 B1 * | 5/2004 | Sawada ....................... 709/212 |
| 6,778,646 B1 * | 8/2004 | Sun ......................... 379/93.05 |
| 7,076,550 B1 * | 7/2006 | Noguchi et al. ............. 709/225 |
| 2001/0056487 A1 * | 12/2001 | Yoo ........................... 709/225 |

FOREIGN PATENT DOCUMENTS

| | | |
|---|---|---|
| JP | 2000232527 | 8/2000 |
| JP | 2000-308154 | 11/2000 |
| JP | 2001-057558 | 2/2001 |

OTHER PUBLICATIONS

Corina Scheiter, et al., "Von Jini bis Inferno, Middleware Schafft Ein Einheitliches Anwendungssystem Fur Inhouse-Techniken," 2000, pp. 148-153.

* cited by examiner

METHOD FOR SEPARATING MULTIPLE HOME NETWORKS

TECHNICAL FIELD

The present invention relates to a home networking system, and more particularly, to a method for separating multiple home networks networked in one communication line into each home network.

BACKGROUND ART

A home networking system is a system for controlling household appliances, such as, PC, cellular phone, refrigerator, or washing machine, by one network.

More specifically, the home networking system connects all peripheral apparatuses (they are interchangeably used with household appliances) at home through one main apparatus over the home networking net, and controls them in whole. Currently, IEEE1394-based or IEC61883-based home network system is under development.

In general, a protocol for integrating and controlling a number of signals on a communication bus is needed to control every peripheral apparatus at home through one main apparatus. Moreover, a user should be able to see the current state of each apparatus to realize the home networking in a practical sense.

In fact, such protocol is already being developed.

However, now that every home network is connected to the same communication line, the above-described home networking system according to a related art could have a bad influence on the same kind of apparatuses that are connected to neighboring networks with each other.

For example, suppose that there are two neighboring homes A, and B, as depicted in FIG. 1, and suppose that each home has a network connecting household appliances, e.g., refrigerator, washing machine, air conditioner, microwave, or PC, wherein the networks of two homes are connected to one communication bus.

Therefore, if a user in home A 100 sends a washing machine's code value and execution code value to the washing machine through a PC in order to operate the washing machine, the washing machine of the home A 100 works in accordance to the execution code value. The problem though is that the execution code value is transferred to home B 200 via the communication bus, and makes the washing machine in home B 200 operate as well.

Similarly, if a certain apparatus connected to the network in home A 100 operates, the same kind of apparatus in the neighboring home B located within the effective radius of the radio signal is operated also.

DISCLOSURE OF INVENTION

It is, therefore, an object of the present invention to provide a method for separating multiple home networks networked in one communication line into each home network.

To achieve the above object, there is provided the method for separating multiple home networks, which includes the steps of: forming home network by interconnecting apparatuses in a house to communicate with one another; setting an independent home code upon each apparatus networked in the home network; interconnecting the home networks formed in each house; and generating a packet data including the independent home code, and performing communication among apparatuses by using the packet data including the independent home code.

Preferably, the step of setting individual home code further includes sub-steps of: designating a home code and an apparatus code that are pre-designated during a manufacturing process in a plant as a temporary apparatus code; comparing the designated temporary apparatus code with an apparatus code connected to a home network; if no apparatus having the same code with the designated temporary apparatus code exists, designating the designated temporary apparatus code to a corresponding apparatus as its own code, and then setting on the corresponding apparatus; if an apparatus having the same code with the designated temporary apparatus code exists, designating an arbitrary code randomly through an apparatus that controls a home network; and repeating the comparing step by using the designated arbitrary code.

Preferably, a user, at the setting step, manually adjusts a deep switch mounted in the apparatus to a defined value.

Also, an arbitrary specific number, at the setting step, is combined to a corresponding code number of an apparatus.

BRIEF DESCRIPTION OF DRAWINGS

The above objects, features and advantages of the present invention will become more apparent from the following detailed description when taken in conjunction with the accompanying drawings, in which.

BEST MODE FOR CARRYING OUT THE INVENTION

A preferred embodiment of the present invention will now be described with reference to the accompanying drawings.

Figure 1:
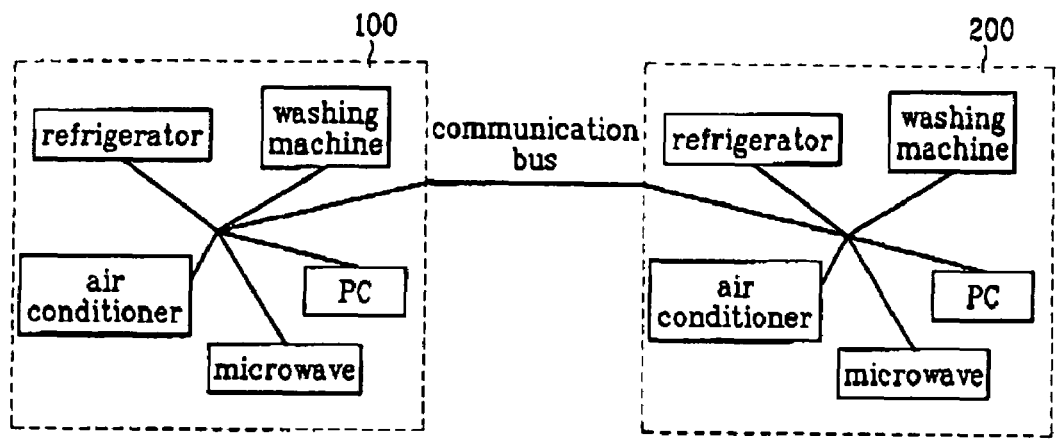
FIG. 1 is a diagram showing configuration of multi home networks in accordance with the present invention.
Figure 2:
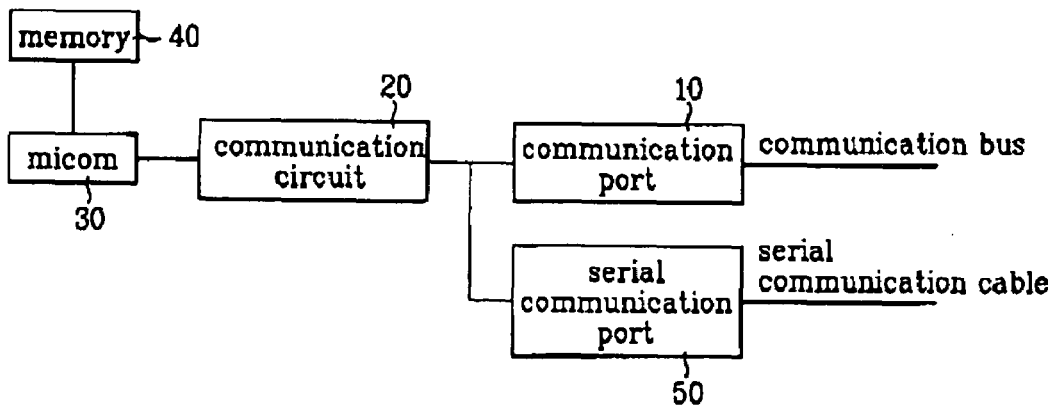
FIG. 2 diagrammatically illustrates a detailed structure of each apparatus in accordance with the present invention.

FIG. 1 is a diagram showing configuration of multi home networks in accordance with the present invention, and FIG. 2 diagrammatically illustrates a detailed structure of each apparatus according to the present invention.

As depicted in FIG. 1, the household appliances are interconnected to one another by configuring a network through a wire/radio communication bus. Every home has one of the networks.

Also, every apparatus is networked in a manner that they can communication to one another through a communication bus, and the communication bus, like a power line or radio, is shared with other neighbors.

The communication standard for a typically used communication bus is RS-232C.

As illustrated in FIG. 2, each apparatus for configuring a home network includes a communication port 10 connected to other apparatuses of the outside through a communication bus, a communication circuit 20 for converting transmitted/received signals through the communication port 10 to signals relevant to the communication bus, a memory 40 for storing packet data information that is necessary for communication, a serial communication port 50 connected to an apparatus one by one, the apparatus having a built-in program for use of a home code for setting a home code to a corresponding apparatus, and a micom 30 for controlling the communication port 10, the communication circuit 20, the memory 40, and the serial communication port 50.

Here, the memory 40 is an inactive memory just like EEPROM or flash memory, and can be modified after storing data.

Figure 3:
FIG. 3 is a diagram depicting configuration of packet data in accordance with the present invention.

As shown in FIG. 3, the packet data configuration stored in the memory 40 includes a preamble, a home code, a receiver's code, a sender's code, a control code, and an error check domain.

More details on the method for separating multi home networks embodying the principles of the present invention are now provided below with reference to the drawings enclosed.

Figure 4:
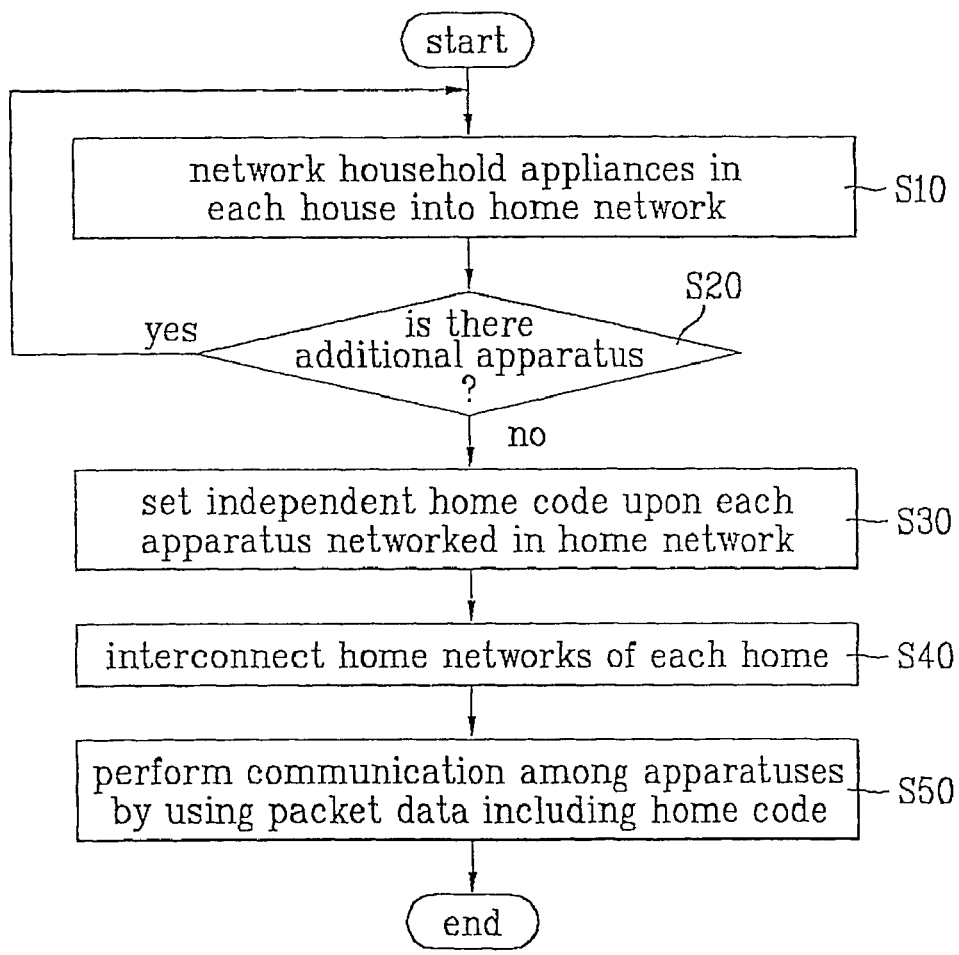
FIG. 4 is a flow chart explaining a method for separating multi home networks in accordance with the present invention.

FIG. 4 is a flow chair explaining a method for separating multi home networks in accordance with the present invention.

Referring to FIG. 4, every household appliance in a home is networked through a wire/radio communication bus, and then a network is configured for enabling all of the appliances to communicate with the same communication standard. At this point, when a user connects an apparatus to a network for the first time, the user needs to input the product name of the apparatus that is connected to a controlling apparatus of a home network, number of products, place of installation, and a user ID.

Then the apparatus for controlling the home network requests the apparatus concerned, i.e., the apparatus to be connected to the network for the first time, to register, and once connecting the apparatus to the network is completed, an address is assigned to the apparatus. At this time, a new address is designated to prevent any collision that might occur when a plurality of products of the same kind are trying to connect (S10).

In case there is another apparatus to be added later, the above-described procedure is repeated, and the apparatus is provided with a new address, and then it is connected to the home network (S20).

Afterwards, an independent home code value is set upon each apparatus networked in the home network (S30).

And, similar to a power line or radio, the home network that is configured for each home, respectively, is shared with other neighbors (S40).

Although the home network is shared with other homes, one apparatus in one house does not have any influence on another apparatus of the same kind ill another house any more because a different, independent home code value set on each house.

More specifically, as illustrated in FIG. 3, when packet data is generated and transmitted/received by using a designated address for communication among apparatuses, the packet data can be transferred to a neighboring home via the communication line, given that the apparatus of the same kind exists in the neighborhood. Nevertheless, the same apparatus in the neighborhood does not operate because the transferred packet data includes a specific, distinctive home code value and the apparatus cannot recognize the packet data. In this way, it is possible to distinguish data for each house (S50).

The method for setting a home code value for each apparatus can be divided into three kinds as follows.

The first method involves a serial communication port mounted in each apparatus. That is, the apparatus with a built-in program is connected to an apparatus to be set one by one, by using the serial communication cable, and then control data for setting the home code to a relevant apparatus is transmitted.

The network of each house has an apparatus with a built-in program for designating and managing a home code value, and based on the program and using the serial communication cable mounted in each household apparatus, a home code value is given.

In other words, every apparatus manufactured in a plant has a home code and a certain initial value of an apparatus code (it is used as a sender's code) by nature. Therefore, when a home network is configured for the first time, every apparatus networked in a home network is checked whether the same code is being already used for a certain apparatus.

If it turns out that there is no such thing using the same code with a temporarily designated code, the temporarily designated code for the relevant apparatus becomes its own code.

However, if there is an apparatus having the identical code with the temporarily designated code, an arbitrary code is temporarily designated through a home network controlling apparatus, and the above procedure is repeated until there is no identical code present.

In this manner, a home code value can be set upon the newly networked apparatus.

According to the second method, a user adjusts the position of a switch manually since every apparatus has a plurality of switches through which the user can set a home code value manually.

Figure 5:
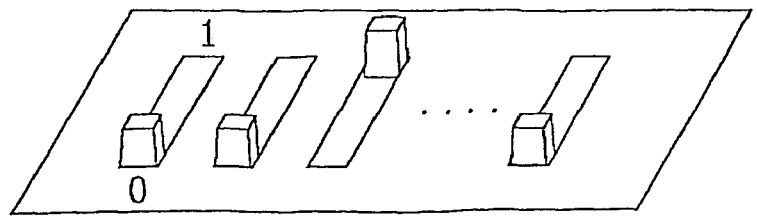
FIG. 5 shows an embodiment of the present invention for setting a home code to each apparatus.

That is, as depicted in FIG. 5, the user sets a corresponding home code value on the newly networked apparatus by manually-adjusting a DIP switch mounted in each apparatus during the manufacturing process in a plant.

That is, as depicted in FIG. 5, the user sets a corresponding home code value on the newly networked apparatus by manually-adjusting a deep switch mounted in each apparatus during the manufacturing process in a plant.

The third method involves combining an arbitrary number in front of a relevant number of an apparatus.

In other words, in case that a home network in a house uses a radio frequency like PLC, bluetooth, or WAP (Wireless Application Protocol), each house can have its own number by putting a resident registration number of a householder in front of the apparatus number. This is based on the assumption that the same model can exist among different homes especially in a building with many houses. This method is very effective in that it removes communication interference with other homes.

Moreover, each household appliance, the clients, can identify its own protocol by comparing its own apparatus ID to upper ID bits of the protocol manifested on the communication, which is accomplished by inserting its own apparatus ID to the top level bit in the course of transmitting a communication protocol.

Therefore, a number of houses can share one transmission line at once by setting a different, independent home code upon each apparatus, and as a result thereof, an entire region can be controlled in whole if a gateway in a house is given away or if the transmission speed is fast enough. Further, the entire nation can be controlled very easily as well.

While the invention has been shown and described with reference to certain preferred embodiments thereof, it will be understood by those skilled in the art that various changes in form and details may be made therein without departing from the spirit and scope of the invention as defined by the appended claims.

INDUSTRIAL APPLICABILITY

In conclusion, the method for separating multi home networks embodying the principles of the present invention has the following advantages:

First of all, even though a number of networks share the same communication line, it is still possible to distinguish each network without using a separate hardwarelike filter.

Secondly, because the present invention can isolate a home network without requiring a specific serial number of a product, like all Ethernet card that is peculiar worldwide, every household appliance can be distinguished easily.

What is claimed is:

1. A method for separating multi home networks, comprising the steps of:
   forming home network by interconnecting apparatuses in a house to communicate with one another;
   setting a home code for each apparatus networked in the home network, wherein the home code uniquely identifies the home network among a plurality of home networks, wherein said setting comprises:
   designating the home code and an apparatus code, that are pre-designated during a manufacturing process in a plant as a temporary apparatus code;
   comparing the designated temporary apparatus code with an apparatus code connected to a home network;
   if no apparatus having the same code with the designated temporary apparatus code exists, designating the designated temporary apparatus code to a corresponding apparatus as its own code, and then setting on the corresponding apparatus;
   if an apparatus having the same code with the designated temporary apparatus code exists, designating an arbitrary code randomly through an apparatus that controls a home network; and
   repeating the comparing step by using the designated arbitrary code as the designated temporary apparatus code until there is no identical code present;
   interconnecting the home networks formed for each house; and
   generating a packet data including the home code, and performing communication among apparatuses by using the packet data including the home code.

2. The method according to claim 1, wherein the home code is set by manually adjusting a switch mounted in the apparatus to a defined value, the home code being the defined value.

3. The method according to claim 1, wherein the home code comprises an arbitrary specific number, provided at the setting step, and a corresponding code number of an apparatus.

4. The method according to claim 3, wherein the specific number is a resident registration number.

5. The method according to claim 1, wherein the packet data includes a preamble, a home code, a receiver's code, a sender's code, a control code, and an error domain.

6. The method according to claim 1, wherein the plurality of home networks share the same communication line.

* * * * *